B. W. KADEL.
RAILWAY CAR.
APPLICATION FILED OCT. 6, 1917.
1,268,726.
Patented June 4, 1918.
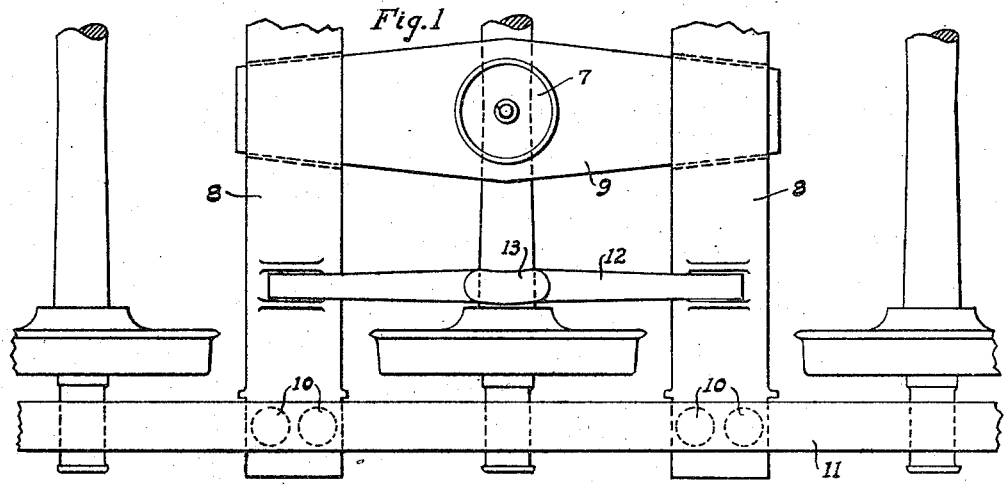
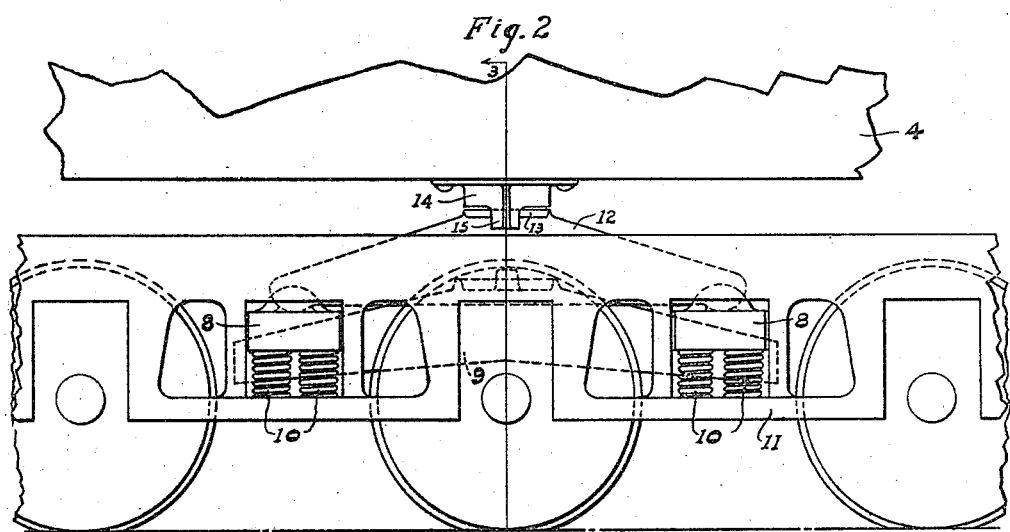
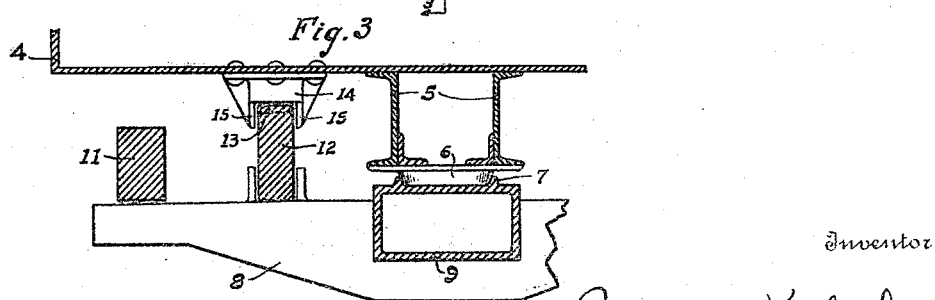
Witness
G. Maskin Davis.
Inventor
Byers W. Kadel.

UNITED STATES PATENT OFFICE.

BYERS W. KADEL, OF ROANOKE COUNTY, VIRGINIA.

RAILWAY-CAR.

1,268,726. Specification of Letters Patent. Patented June 4, 1918.

Application filed October 6, 1917. Serial No. 195,038.

*To all whom it may concern:*

Be it known that I, BYERS W. KADEL, a citizen of the United States, residing in the county of Roanoke and State of Virginia, have invented certain new and useful Improvements in Railway-Cars, of which the following is a specification.

This invention relates to railway cars and has for its object to provide an improved arrangement of side bearing members for the truck and the body. With such object in view the invention consists of the formation, combination and arrangement of parts as will be herein described and claimed.

In the drawings, Figure 1 is a partial plan view of a car truck constructed for use with the present improvements. Fig. 2 is a broken side elevation view of the same with a portion of a car body mounted thereon and showing my improvements in their assembled form. Fig. 3 is a transverse vertical section of the same taken substantially on the line 3—3 of Fig. 2. In these figures various well-known truck and car-body parts which are not essential to a proper showing of my improvements have been omitted.

Referring to these drawings, the car body is indicated by the numeral 4, it having center sills 5 and a center plate 6. This is carried by the truck center plate 7, which is disposed on the truck bolster. This truck bolster consists of a pair of transverse members 8 and a longitudinally-disposed center member 9 on which the center plate 7 is set. The members 8 rest at their ends upon springs 10 set in side frames 11. Thus the members 8 may move vertically and are capable of movement with respect to each other in and out of a vertical plane. The wheels, axles, etc., of the truck may be arranged in any suitable manner to correctly carry the load to the rail.

The present improvements are in connection with the side bearing arrangement. To carry these upon the truck I provide side-bearing bars such as 12, which span from one bolster member 8 to the other and with the side-bearing pad 13, disposed on the upper face thereof. A coöperating body side bearing 14 is secured to the under face of the car body. It will be recognized that because of the relative vertical movement of the members 8 the bar 12 should not be rigidly attached to them, but should simply rest on them, preferably in suitable pockets. In order to hold the bar 12 and its side bearing in vertical alinement there are guides 15 attached to the car body which engage and aline the bar 12 and prevent its tipping to either side. These brackets 15 are made in reality as a part of the body side bearing.

In Fig. 1 it will be seen that the truck side bearing is made arcuate in shape, being developed about the center of the center plate. Thus the guides 15 will present a constant clearance as the truck turns beneath the car as on curves.

I have thus described an embodiment of my invention. Other embodiments are possible within the scope of the appended claims.

What I claim is:

1. A railway car having a load-delivering center plate, a supporting truck therefor having a coöperating load-receiving center plate, a side-bearing member loosely supported upon the truck and a coöperating one rigidly supported upon the body, and means attached to one of said side-bearing members and engaging the other for holding the truck side-bearing member in vertical alinement.

2. A railway car having a supporting truck, including a bolster construction with two transverse members which are capable of movement with respect to each other in and out of a horizontal plane, a side-bearing member extending from one to the other of the movable bolster members and loosely supported thereon, a coöperating side-bearing member upon the car body, and means attached to the car body and engaging the truck side-bearing member for holding the latter in vertical alinement.

3. A railway car including a body and a swiveling truck for supporting the same, a side bearing on the truck and a coöperating one upon the body, and guides attached to one of the side bearings and engaging and alining the other, the portion of the alined side bearing within the guides being shaped in an arcuate form, the center of the arc being coincident with the center of rotation of the truck.

In testimony whereof I affix my signature.

BYERS W. KADEL.

Copies of this patent may be obtained for five cents each, by addressing the "Commissioner of Patents, Washington, D. C."